US008907902B2

(12) United States Patent
Cheng et al.

(10) Patent No.: US 8,907,902 B2
(45) Date of Patent: Dec. 9, 2014

(54) ELECTRONIC DEVICE CAPABLE OF CONTROLLING LED BACKLIGHT MODULES AND METHOD THEREOF

(75) Inventors: Hua-Dong Cheng, Shenzhen (CN); Hui Yin, Shenzhen (CN); Xiao-Guang Li, Shenzhen (CN); Han-Che Wang, Taipei Hsien (TW); Kuan-Hong Hsieh, Taipei Hsien (TW); Chuan-Hong Wang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1176 days.

(21) Appl. No.: 12/841,122

(22) Filed: Jul. 21, 2010

(65) Prior Publication Data

US 2011/0109569 A1 May 12, 2011

(30) Foreign Application Priority Data

Nov. 12, 2009 (CN) .......................... 2009 1 0309632

(51) Int. Cl.
*G06F 3/041* (2006.01)
*G09G 3/34* (2006.01)

(52) U.S. Cl.
CPC ............ *G09G 3/342* (2013.01); *G09G 2330/02* (2013.01); *G09G 2360/02* (2013.01)
USPC .......................................................... 345/173

(58) Field of Classification Search
None
See application file for complete search history.

(56) References Cited

U.S. PATENT DOCUMENTS

| | | | | |
|---|---|---|---|---|
| 2004/0021681 | A1* | 2/2004 | Liao | 345/702 |
| 2005/0071775 | A1* | 3/2005 | Kaneko | 715/801 |
| 2005/0259064 | A1* | 11/2005 | Sugino et al. | 345/102 |
| 2009/0109164 | A1* | 4/2009 | Um | 345/102 |
| 2009/0322690 | A1* | 12/2009 | Hiltunen et al. | 345/173 |
| 2010/0020092 | A1* | 1/2010 | Canu et al. | 345/589 |
| 2010/0295802 | A1* | 11/2010 | Lee | 345/173 |

FOREIGN PATENT DOCUMENTS

| | | | |
|---|---|---|---|
| CN | 101174181 | A | 5/2008 |
| CN | 101414695 | A | 4/2009 |
| CN | 101465107 | A | 6/2009 |
| EP | 1056261 | A2 * | 11/2000 |
| TW | 200721085 | A | 6/2007 |
| WO | WO 2008030563 | A2 * | 3/2008 |
| WO | WO 2009049331 | A2 * | 4/2009 |

* cited by examiner

*Primary Examiner* — Grant Sitta
*Assistant Examiner* — Kirk Hermann
(74) *Attorney, Agent, or Firm* — Novak Druce Connolly Bove + Quigg LLP

(57) ABSTRACT

A method for controlling light-emitting diode (LED) backlight modules applied in an electronic device is provided. The electronic device includes a first display and a second display. The second display includes at least two display areas. Each display area corresponds to one LED backlight module, and each display area displays option icons of an option type. The method includes: determining the file type of a file currently displayed on the first display and determining which of the option types the determined file type corresponds to; determining which of the at least two LED backlight modules the at least one determine option type corresponds to; and outputting control signals to turn on at least one of the determined LED backlight modules. A related electronic device is also provided.

4 Claims, 4 Drawing Sheets

ELECTRONIC DEVICE CAPABLE OF CONTROLLING LED BACKLIGHT MODULES AND METHOD THEREOF

BACKGROUND

1. Technical Field

The present disclosure relates to electronic devices capable of controlling light-emitting diode (LED) backlight modules and methods thereof and, particularly, to an electronic device capable of selectively turning on/off its LED backlight modules and a method thereof.

2. Description of Related Art

Electronic devices including an LCD display and a touch-sensitive display are popular. The touch-sensitive display is relatively smaller than the LCD display, and the touch-sensitive display is usually used to display option icons to control contents currently displayed on the LCD display. Conventionally, when the touch-sensitive display is turned on, a backlight module is turned on to light the whole touch-sensitive display, thus all the option icons displayed on the touch-sensitive are highlighted. However, among the option icons some of which cannot be used to control currently displayed content. Therefore, lighting the whole touch-sensitive display to cause all the displayed option icons to be highlighted wastes power of the electronic device.

BRIEF DESCRIPTION OF THE DRAWINGS

The components of the drawings are not necessarily drawn to scale, the emphasis instead being placed upon clearly illustrating the principles of an electronic device capable of controlling LED backlight modules and a method thereof. Moreover, in the drawings, like reference numerals designate corresponding parts throughout several views.

DETAILED DESCRIPTION

Figure 1:
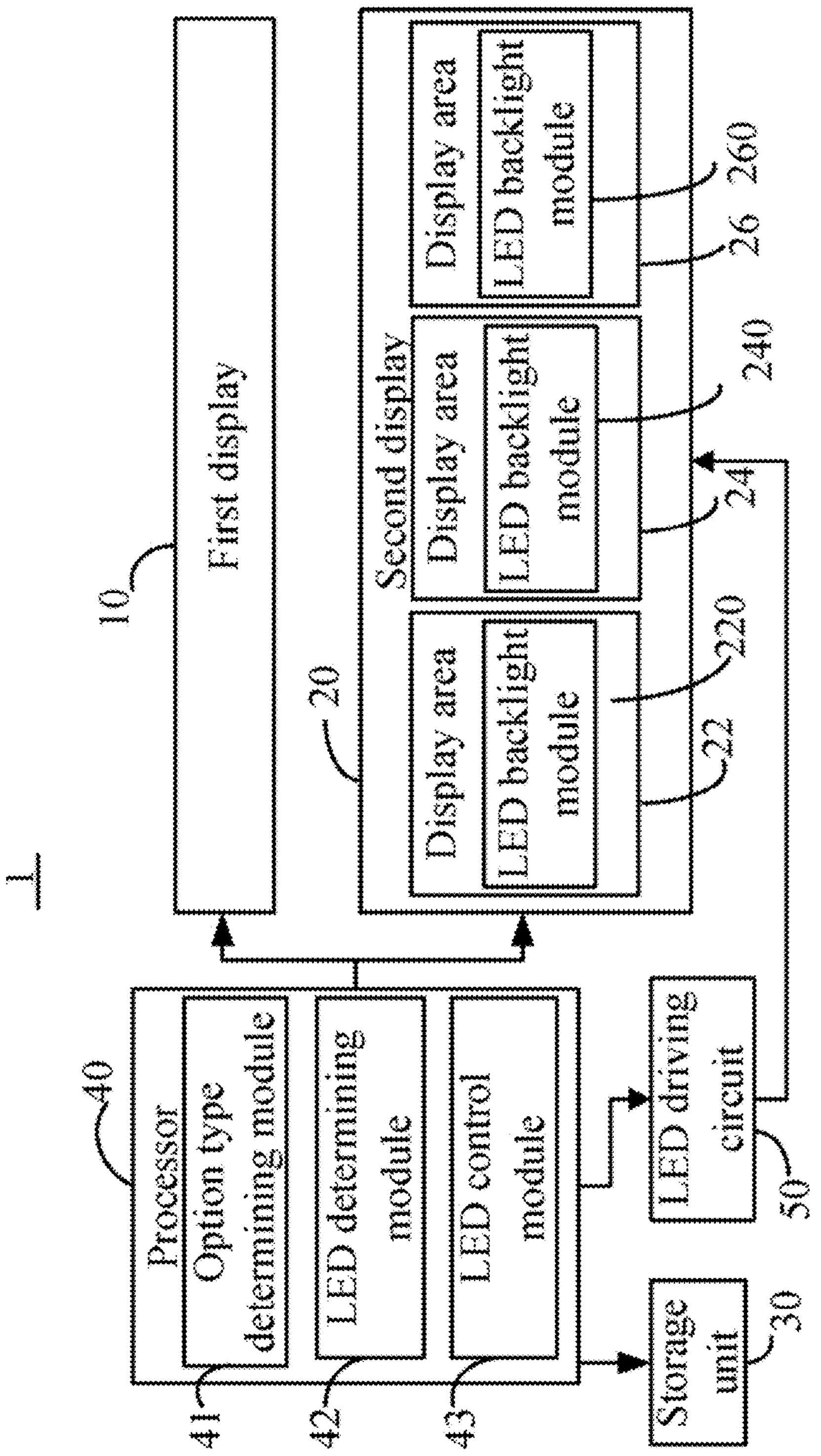
FIG. 1 is a block diagram of an electronic device in accordance with an exemplary embodiment.
Figure 2:
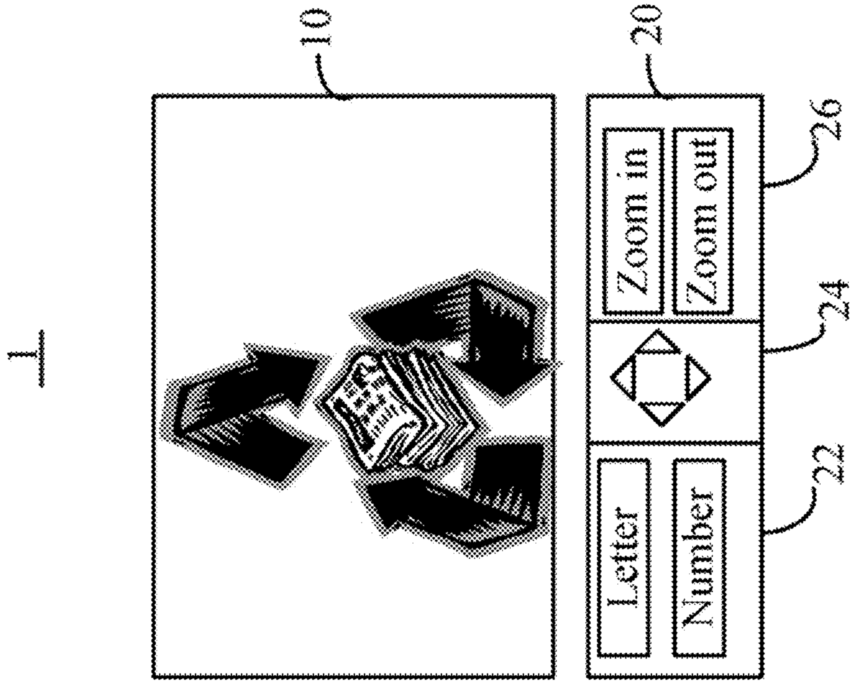
FIG. 2 is a schematic view showing a file displayed on a first display and option icons displayed on a second display of the electronic device of FIG. 1.

Referring to FIGS. 1-2, an electronic device 1 includes a first display 10 and a second display 20. In this embodiment, the first display 10 is an LCD display and the second display 20 is a touch-sensitive display. The second display 20 displays selectable option icons for controlling files displayed on the first display 10. The second display 20 includes at least two display areas and at least two LED backlight modules, and each of the displays areas corresponds to one of the LED backlight modules. That is, when one LED backlight module is turned on, the display area corresponding to the LED backlight module is lit. The option icons are classified into at least two option types, and the option icons of one option type are displayed in the same display area (as shown in FIG. 2). In this embodiment, the second display 20 includes three display areas 22, 24, and 26 respectively corresponding to three LED backlight modules 220, 240, and 260. The option icons are classified into a first option type, a second option type, and a third option type. In this embodiment the second display 20 may further display scroll bars employed to cause hidden option icons to be viewable.

The electronic device 1 further includes a storage unit 30 configured for storing a file type-option type table (hereinafter table A) and an option type-LED backlight module table (hereinafter table B). In table A, each file type corresponds to at least one option type, that is, the option icons of at least one option type may control files of each file type. As shown below, a first file type, for example, a WORD type, corresponds to the first option type and the second option type, and a second file type, for example, a JPEG type, corresponds to the third option type. In table B, each option type corresponds to one LED backlight module.

TABLE A

| File type | Option type |
|---|---|
| First file type | First option type |
| | Second option type |
| Second file type | Third option type |
| . . . | . . . |

TABLE B

| Option type | LED backlight module |
|---|---|
| First option type | LED backlight module 220 |
| Second option type | LED backlight module 240 |
| Third option type | LED backlight module 260 |

The electronic device 1 further includes a processor 40 and an LED driving circuit 50. The processor 40 includes an option type determining module 41, an LED determining module 42, and an LED control module 43.

The option type determining module 41 is configured to determine the file type of a file currently displayed on the first display 10 and determine which of the option types the determined file type corresponds to according to the table A.

The LED determining module 42 is configured to determine which LED backlight module each determined option type corresponds to according to the table B.

The LED control module 43 is configured to output control signals to control the LED driving circuit 50 to turn on at least one determined LED backlight module.

With such configuration, the electronic device 1 can selectively turn on one or more LED backlight modules to light one or more display areas where the option icons capable of controlling the currently displayed file are displayed, which conserves power.

Figure 3:
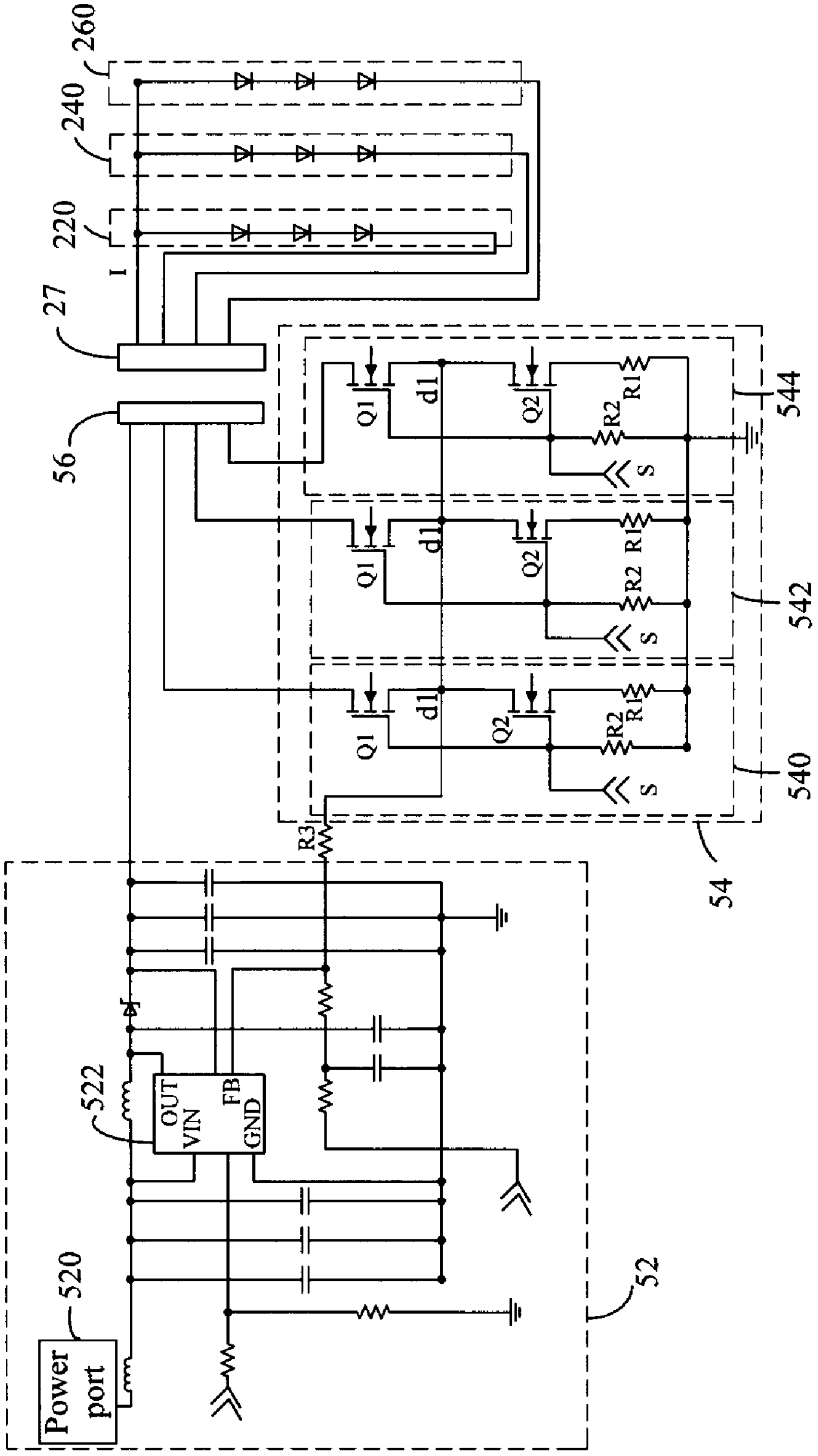
FIG. 3 is a circuit diagram of an LED driving circuit of the electronic device of FIG. 1.

Referring to FIG. 3, the LED driving circuit 50 includes a power providing module 52, a driving module 54, and a first connector 56. In this embodiment, the second display 20 includes a second connector 27 coupled to the first connector 56, and the LED backlight modules 220, 240, and 260 are electrically connected to the LED driving circuit 50 via the second connector 27 and the first connector 56. In this embodiment, the LED backlight modules 220, 240, and 260 are connected in parallel, and each LED backlight module includes three diodes.

The power providing module 52 is configured to provide power to the LED driving circuit 50. The power providing module 52 includes a power port 520 and a control chip 522. The power port 520 can be connected to a power source, for example batteries. The control chip 522 includes a voltage input (hereinafter VIN) port, a ground (hereinafter GND)

port, a feedback (hereinafter FB) port, and an output (hereinafter OUT) port. The VIN port is electrically connected to the power port 520. The FB port is electrically connected to the driving module 54 via a resistor R3. The control chip 522 outputs a driving current via the OUT port for turning on one or more LED backlight modules, and the value of the driving current (hereinafter I) is obtained according to the value of the current of the FB port (hereinafter $I_{FB}$). In the embodiment, the voltage value of the FB port (hereinafter $V_{FB}$) is a constant.

In this embodiment, the driving module 54 includes driving sub-modules 540, 542, and 544. The driving sub-modules 540, 542, and 544 are respectively connected to the LED backlight modules 220, 240, and 260. Each driving sub-module includes two N-channel metal-oxide-semiconductor field-effect transistors (hereinafter NMOSFET) Q1 and Q2 and a resistor R1 connected between the first connector 56 and the ground. The drain of each NMOSFET Q1 is connected to the first connector 56. The source of the NMOSFET Q1 of each driving sub-module is connected to the drain of the NMOSFET Q2 of the driving sub-module. The source of each NMOSFET Q2 is connected to the ground via one resistor R1. The gates of the NMOSFETs Q1 and Q2 of each driving sub-module constitute a signal input port S. Each signal input port S is connected to the processor 40 to receive the control signals from the LED control module 43.

The node d1 between the source of the NMOSFET Q1 and the drain of the NMOSFET Q2 of each driving sub-module is connected to the FB port via the resistor R3. Each driving sub-module further includes a resistor R2 arranged between the gate of the NMOSFET Q2 of each driving sub-module and the ground. In this embodiment, the resistance value of each resistor R2 is greater than that of each resistor R1.

When the LED control module 43 outputs the control signals to the signal input port S of at least one driving sub-module, the NMOSFETs Q1 and Q2 of the at least one driving sub-module are turned on, and the resistor R1 of the at least one driving sub-module is connected in parallel between the resistor R3 and the ground. As the resistance value of each resistor R2 is greater than that of each resistor R1, the path including the resistor R2 of the at least one driving sub-module is substantially an open path. That is, the value of the current of the path can be ignored, and the FB port, the resistor R3, the at least one resistor R1 connected in parallel, and the ground constitute a path. As $V_{FB}$ is a constant value, $I_{FB}$ is thus $V_{FB}/(R3+R1/N)$. N is the number of the at least one resistor R1 connected in parallel, that is, N is the number of the at least one driving sub-module whose signal input port S receives the control signals. As $V_{FB}$ and the resistance value of the resistor R3 and the resistor R1 are constant, $I_{FB}$ varies according to N. The control chip 522 outputs the driving current to the at least one LED backlight module connected to the at least one controlling sub-module via the OUT port. In this embodiment, the control chip 522 determines the number of the at least one resistor R1 connected in parallel according to $I_{FB}$, and obtains I by a formula $NV_{FB}/R1$, and N is the number of the at least one resistor R1 connected in parallel. When N is one, that is, the number of the at least one driving sub-module whose signal input port S receives the control signals is one, I is $V_{FB}/R1$, and the value of the current of the LED backlight module connected to the one controlling sub-module is $V_{FB}/R1$. When N is two, that is, the number of the at least one driving sub-module whose signal input port S receives the control signals are two, I is $2V_{FB}/R1$, and the value of the current of each LED backlight module connected to one of the two driving sub-modules is still $V_{FB}/R1$. Therefore, no matter whether one or more driving sub-modules whose signal input ports S receive the control signals, the value of the current of each LED backlight module remains unchanged, thus each LED backlight module can be normally turned on.

Figure 4:
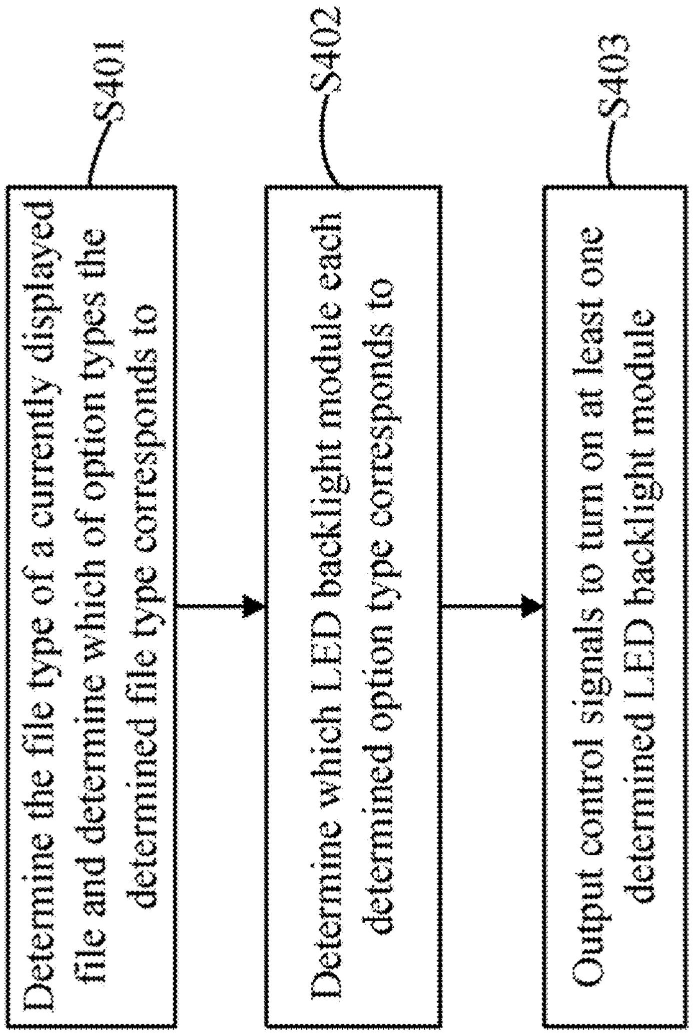
FIG. 4 is a flowchart of a method for controlling LED backlight modules of the electronic device of FIG. 1 in accordance with an exemplary embodiment.

FIG. 4 is a flowchart of a method for controlling the LED backlight modules 220, 240, and 260.

In step S401, the option type determining module 41 determines the file type of a currently displayed file and determines which of the option types the determined file type corresponds to according to the table A.

In step S402, the LED determining module 42 determines which LED backlight module each of the at least one determined option type corresponds to according to the table B.

In step S403, the LED control module 43 outputs the control signals to control the LED driving circuit 50 to turn on at least one determined LED backlight module.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device, comprising:

a first display to display files;

a second display comprising at least two display areas and at least two light-emitting diode (LED) backlight modules, each of the at least two display areas corresponding to one of the at least two LED backlight modules, and each of the at least two display areas being configured to display option icons of an option type to control the files displayed on the first display;

a storage unit configured to store a file type-option type table and an option type-LED backlight module table, the file type-option type table recording relationship between the file types and the option types, each of the file types corresponds to at least one option type, and the option type-LED backlight module table recording relationship between the option types and the LED backlight modules, each of the option types corresponding to one of the LED backlight modules;

a processor configured to:

determine the file type of a file currently displayed on the first display and determine which of the option types the determined file type corresponds to according to the file type-option type table;

determine which LED backlight module each of the at least one determined option type corresponds to according to the option type-LED backlight module table; and output control signals to an LED driving circuit to turn on at least one of the determined LED backlight modules;

wherein, the LED driving circuit comprises a power providing module and a driving module, the power providing module is configured to provide power to the LED driving circuit, the driving module is configured to receive the control signals and turn on the at least one of the determined LED backlight modules, the power providing module further comprises a control chip, the control chip comprises a feedback port and an output port, the value of the voltage of the feedback port is constant, and the control chip outputs a driving current to turn on the at least one of the determined LED backlight modules, the value of the driving current is determined according to the value of the current of the feedback port.

2. The electronic device as described in claim 1, wherein the driving module comprises at least two driving sub-modules, each of the at least two driving sub-modules is electrically connected to one of at least two LED backlight modules, each of the at least two driving sub-modules comprises a feedback resistor, the feedback resistor of the at least one driving sub-module connected to the at least one of the determined LED backlight modules is connected to the feedback port in parallel, and the value of the current of the feedback port is determined according to the value of the voltage of the feedback port and the resistance value of the at least one feedback resistor connected in parallel.

3. The electronic device as described in claim 1, wherein the power providing module further includes a power port capable of being connected to a power source, the control chip further comprises a voltage input port being connected to the power port.

4. The electronic device as described in claim 1, wherein the second display is a touch-sensitive display.

* * * * *